United States Patent
Picard et al.

(10) Patent No.: US 7,557,769 B2
(45) Date of Patent: Jul. 7, 2009

(54) ELECTROMAGNETIC INTERFERENCE PROTECTION FOR RADOMES

(75) Inventors: Thomas G. Picard, Winter Garden, FL (US); Rickey D. Akins, Hudson, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 4 days.

(21) Appl. No.: 11/470,990

(22) Filed: Sep. 7, 2006

(65) Prior Publication Data

US 2007/0024523 A1      Feb. 1, 2007

Related U.S. Application Data

(62) Division of application No. 10/638,075, filed on Aug. 8, 2003, now Pat. No. 7,161,552.

(51) Int. Cl.
    *H01Q 1/42* (2006.01)
(52) U.S. Cl. .................. 343/872; 343/909; 430/313
(58) Field of Classification Search ................ 343/756, 343/872, 909; 430/311, 313, 318
    See application file for complete search history.

(56) References Cited

U.S. PATENT DOCUMENTS

| | | | |
|---|---|---|---|
| 3,698,946 A * | 10/1972 | Kaspaul et al. ............ 428/432 |
| 3,907,565 A | 9/1975 | Burton et al. .............. 430/311 |
| 3,961,333 A | 6/1976 | Purinton | |
| 4,388,388 A | 6/1983 | Kornbau et al. ............ 430/253 |
| 4,565,745 A | 1/1986 | Kaminskas ................ 430/252 |
| 5,155,634 A | 10/1992 | Spry | |
| 5,327,149 A | 7/1994 | Kuffer | |
| 5,344,729 A * | 9/1994 | Akins et al. .................. 430/5 |
| 5,352,565 A | 10/1994 | Schroeder ................... 385/8 |
| 5,472,828 A * | 12/1995 | Akins et al. ................ 430/318 |
| 5,543,805 A | 8/1996 | Thaniyavarn .............. 430/318 |
| 5,552,249 A | 9/1996 | Jensen et al. ............... 430/313 |
| 5,567,554 A | 10/1996 | Jensen et al. ............... 430/311 |
| 5,633,105 A * | 5/1997 | Jensen et al. ................. 430/18 |
| 5,650,249 A | 7/1997 | Dull et al. ..................... 430/5 |
| 5,652,631 A * | 7/1997 | Bullen et al. ............... 343/872 |
| 5,751,248 A | 5/1998 | Thaniyavarn .............. 342/368 |
| 5,799,116 A | 8/1998 | Yamamoto ................... 385/2 |
| 5,973,649 A | 10/1999 | Andressen | |
| 6,143,674 A | 11/2000 | Marutsuka ................... 442/8 |
| 6,399,258 B2 | 6/2002 | O'Brien et al. ............. 430/17 |
| 7,235,819 B2 * | 6/2007 | Moustakas ................ 257/103 |
| 2001/0006766 A1 | 7/2001 | O'Brien et al. | |
| 2002/0059881 A1 | 5/2002 | Steiner | |
| 2002/0137342 A1 | 9/2002 | Ishida et al. | |

FOREIGN PATENT DOCUMENTS

EP     0575850 A2    12/1993
JP     08086599      4/1996

* cited by examiner

*Primary Examiner*—Douglas W Owens
*Assistant Examiner*—Jimmy T Vu
(74) *Attorney, Agent, or Firm*—Jeffrey D. Myers; Peacock Myers, P.C.; Timothy D. Stanley

(57) ABSTRACT

A radome, and corresponding method of making, comprising an electro-optic transparent substrate, a semiconductor coating on the substrate, and a frequency selective surface embedded in the coating.

13 Claims, 9 Drawing Sheets

ELECTROMAGNETIC INTERFERENCE PROTECTION FOR RADOMES

CROSS-REFERENCE TO RELATED APPLICATIONS

This application is a divisional patent application and claims priority of U.S. patent application Ser. No. 10/638,075, entitled "Electromagnetic Interference Protection for Radomes", filed on Aug. 8, 2003, and the specifications and claims thereof are incorporated by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field):

The present invention relates to radomes (also known as "domes" or "windows") and methods of making same providing for protection from electromagnetic interference (EMI). Radomes are shells, usually domelike, that are transparent to one or more forms of radiation, and are typically used to house a radiation antenna portion of a sensor.

2. Description of Related Art:

Current EMI coatings for electro-optic (EO) radomes (such as grids) are radio frequency (RF) opaque. Existing RF radomes are EO opaque due to their physical properties. Accordingly, a need exists for radomes for sensors, such as those in missile seekers, which both provide for EMI protection and are EO transparent. The present invention accomplishes this by coating an EO transparent substrate with a semiconductor, preferably gallium nitride (GaN), followed by etching of a frequency selective surface (FSS) in the semiconductor.

BRIEF SUMMARY OF THE INVENTION

The present invention is of a radome, and corresponding method of making, comprising: an electro-optic transparent substrate; a semiconductor coating on the substrate; and a frequency selective surface embedded in the coating. In the preferred embodiment, the substrate is one or a combination of glass, silicon, $MgF_2$, ZnS, and spinels, most preferably sapphire (with a GaN coating). The coating is one or a combination of of GaP, GaN, GaAs, SiC, and Si, most preferably GaN. The surface is preferably etched into the coating (most preferably chemically etched) or ablated into the coating (most preferably by laser at a wavelength of approximately 234 nm). The coating provides substantial protection of a sensor from electromagnetic interference, such as a common aperture electro-optic and radio frequency sensor.

The present invention is also of a radome comprising: an electro-optic transparent substrate; and a semiconductor coating on the substrate; and wherein the semiconductor coating provides substantial protection of a sensor from electromagnetic interference.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a method of building a radome that provides EMI protection without significantly affecting EO/Infrared (IR) and RF performance, and of a radome so constructed. Current technology for EMI protection is not compatible with a common aperture EO/IR/RF sensor. EMI protection for current radomes use grids which are RF opaque or use etched copper patterns which are EO/IR opaque and significantly affect performance. Presently, there are no solutions that provide EMI protection that are both RF and EO transparent.

Figure 1A:
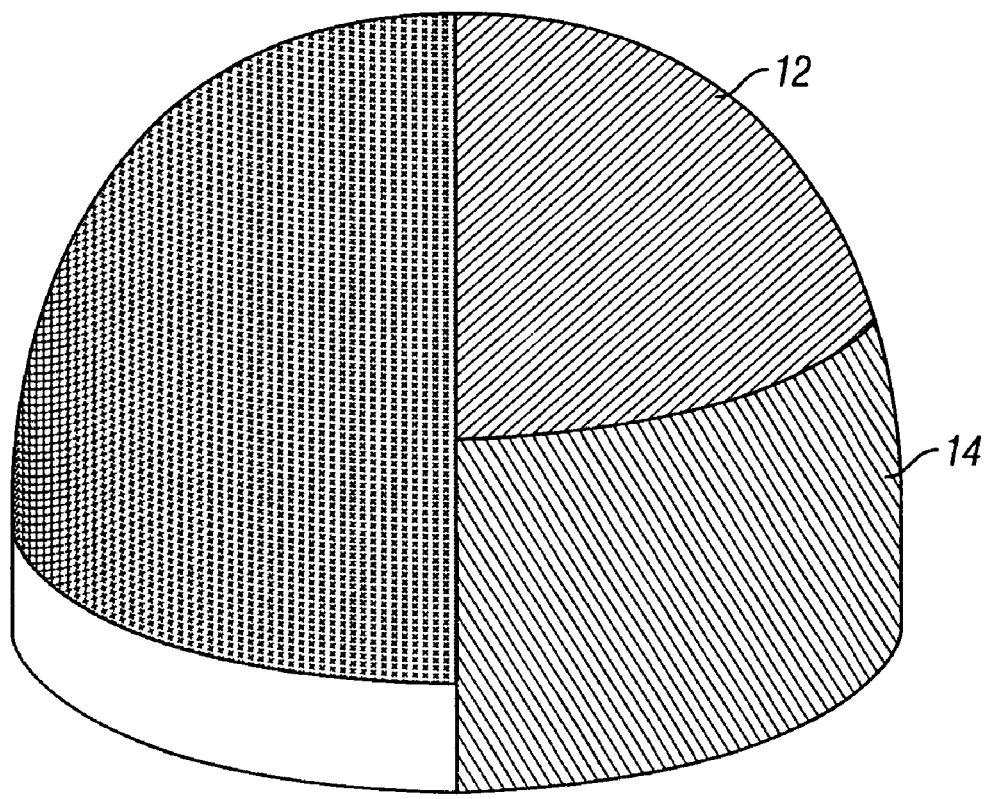
FIG. 1(a) is a front perspective view of a radome according to the invention comprising a semiconductor layer over an EO transparent substrate, with the left half of the figure showing an exterior view, and with the right half of the figure showing the substrate exposed and the overlaying semiconductor layer as unpatterned.
Figure 1B:
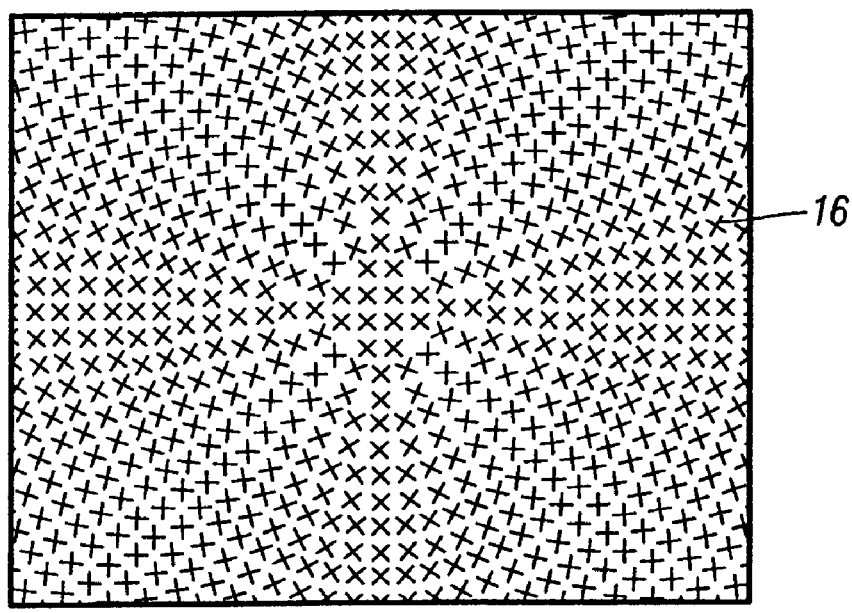
FIG. 1(b) is a magnified view of the radome showing an FSS embedded in the semiconductor layer.

In the present invention, as shown in FIG. 1(a), a semiconductor 12 is "plated" to the radome substrate surface 14 (e.g., $MgF_2$, ZnS, and spinel (such as sapphire)) and, referring to FIG. 1(b), a pattern 16 is then embedded in the semiconductor (preferably by etching, most preferably by chemical etching, or by ablating, most preferably by laser ablating) for RF transmission. GaN is the preferred semiconductor material in that it is a "transparent conductor" and can be fashioned into a EMI protector for EO/IR/RF sensors. Other semiconductors that may be employed with the present invention include GaP, GaAs, SiC, and Si.

Gallium Nitride (GaN) is a semiconductor material that is presently used in many light emitting diode (LED) devices. The material has a rather high intrinsic donor density (approximately $10^{16}/cm^3$) that translates to a higher intrinsic conductivity (approximately 2 $(ohm-cm)^{-1}$) than typical semiconductors and is more conductive as it is doped (generally, semiconductor devices have lower intrinsic donor density and thus lower intrinsic conductivity). Further, a common material for doping GaN is silicon, and silicon is transparent for most of the IR wavelengths. As shown below, IR transmission of GaN is independent of conductivity and thickness for thin samples.

At least two methods may be employed for placing an FSS pattern in GaN. The first is a typical chemical etching process using KOH, which is very caustic. The handling and processing in this etching is more cumbersome than present radome processing in which copper is etched. The second method for GaN pattern removal is laser ablation. GaN can be ablated by the use of a laser tuned to a wavelength of 234 nm. The laser pulse causes the GaN to breakdown and become a gas.

Industrial Applicability:

The invention is further illustrated by the following non-limiting examples. GaN comes in two general forms, single crystal and polycrystalline (or amorphous). Study of both single and polycrystalline GaN was performed.

EXAMPLE 1

Figure 2:
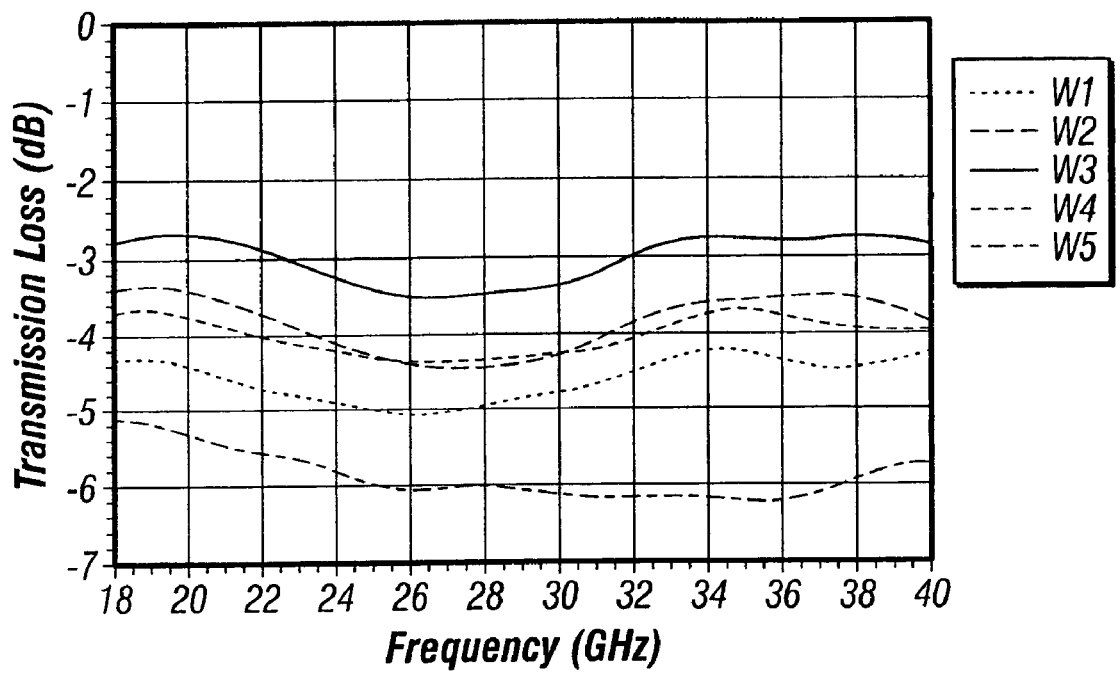
FIG. 2 is a graph of MMW transmission for polycrystalline GaN on a glass substrate.
Figure 3:
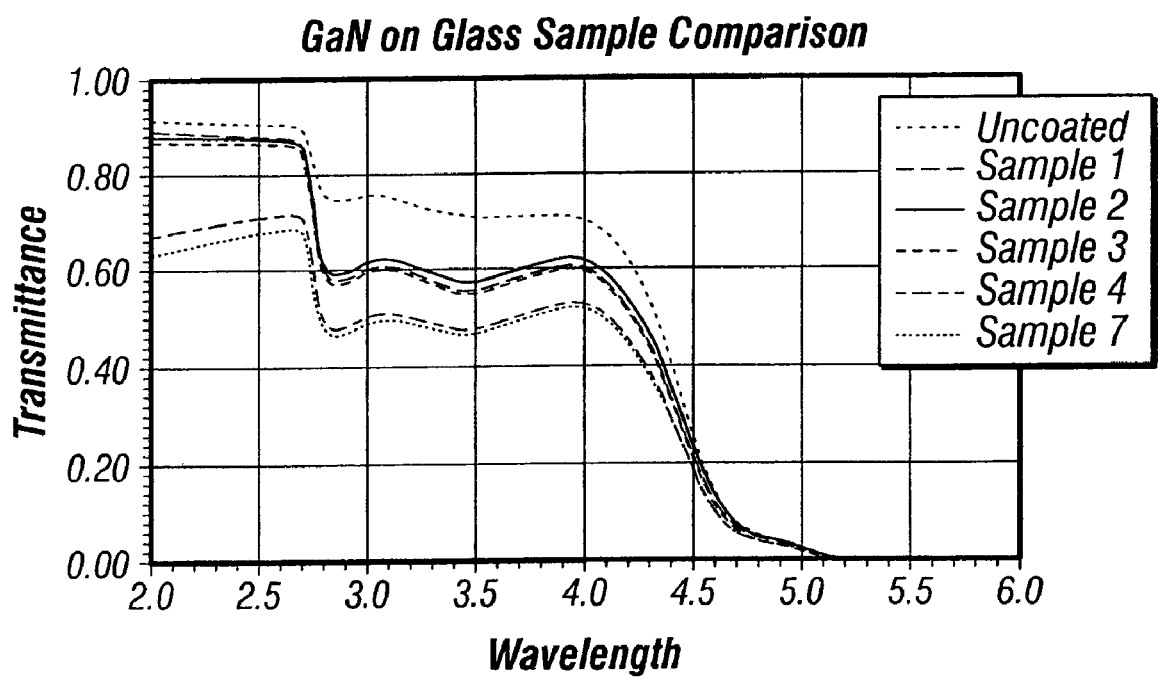
FIG. 3 is a graph of mid-wave IR transmission for polycrystalline GaN on a glass substrate.
Figure 4:
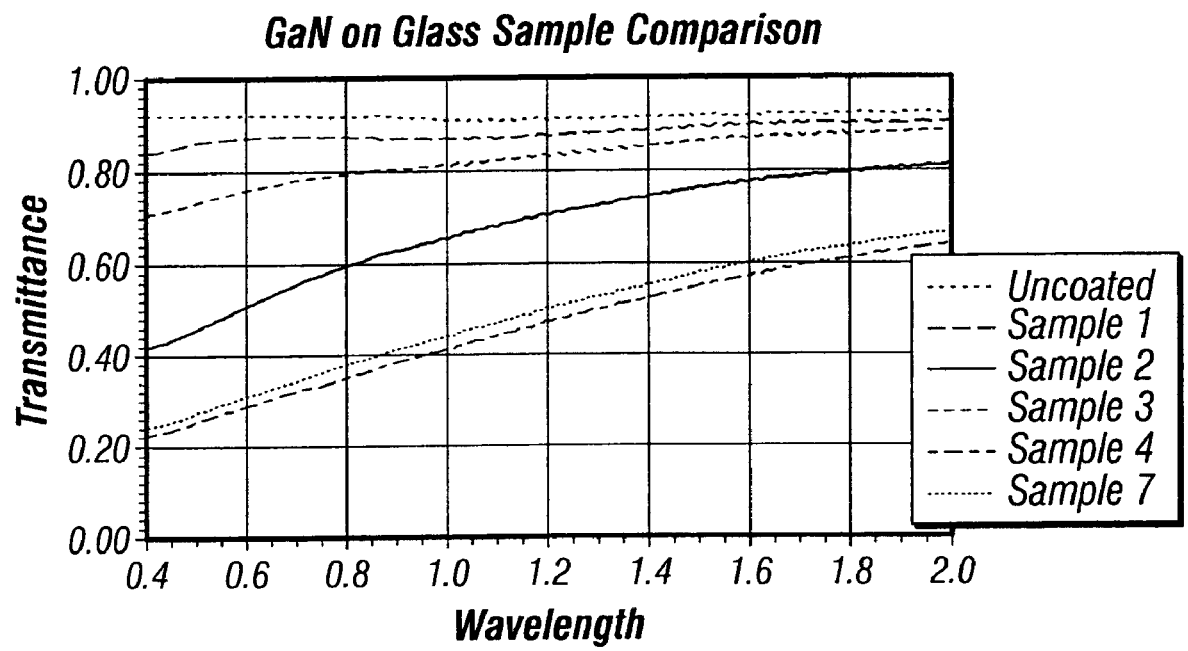
FIG. 4 is a graph of visible and near IR transmission for polycrystalline GaN on a glass substrate.

Five polycrystalline GaN on Glass samples were evaluated for IR transmission and RF transmission, namely transmission loss in both IR and millimeter wave (MMW). FIG. 2 shows that the RF transmission measurement of the samples is close to each other. A further test of the samples with a four-point probe to determine DC conductivity showed that all samples were approximately 2 ohms/square. Mid-Wave IR transmission for the samples is shown in FIG. 3 (a comparison with an uncoated glass sample is shown). This data shows that the polycrystalline GaN is an excellent candidate for EMI protection, due to the fact that there is no correlation between MMW transmission and IR transmission. The visible and near IR transmission measurement is shown in FIG. 4. This data also has an uncoated sample measurement. The data shows the same trends as the mid-wave transmission.

EXAMPLE 2

Figure 5:
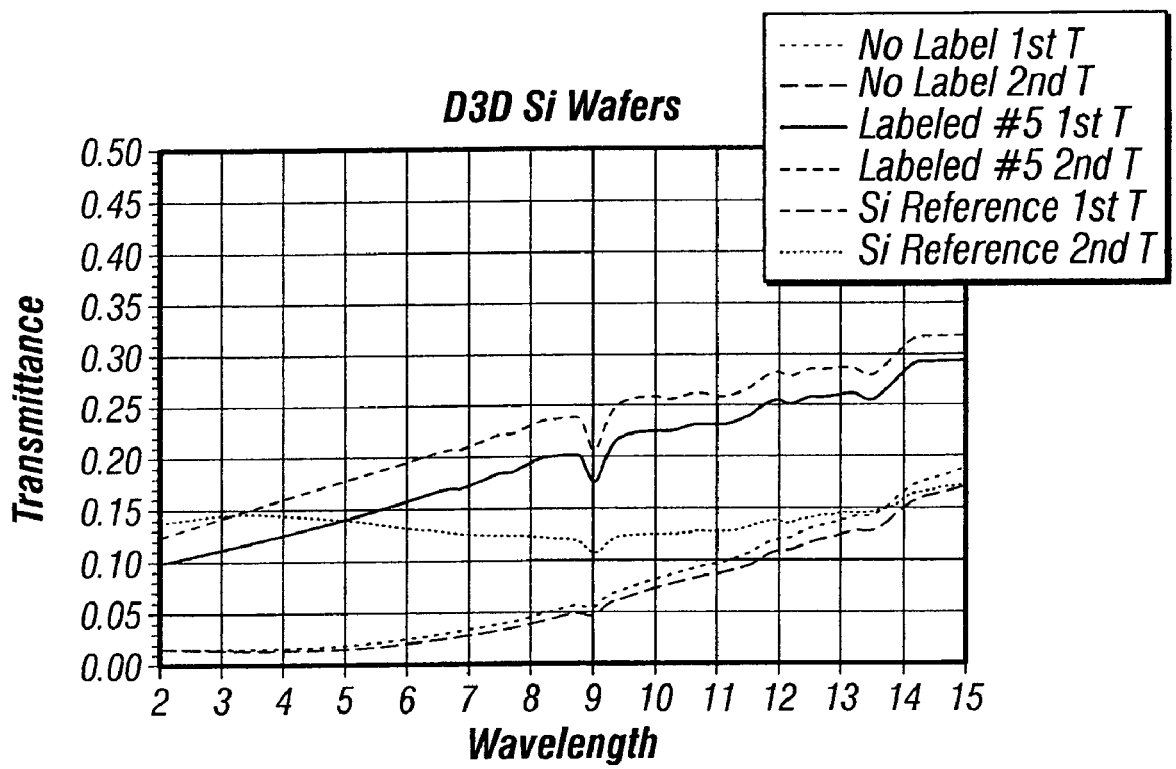
FIG. 5 is a graph of IR transmission for GaN on silicon wafer.

Polycrystalline GaN on silicon samples were investigated. Two samples of silicon, one with GaN and one without GaN were polished on one side, and GaN was placed on the unpolished side. An IR transmission measurement was performed on the samples and a further sample with no GaN, as shown in FIG. 5. This data has significant scatter due to the unpolished side of the silicon. However, note that the silicon with GaN has better IR transmission than either uncoated silicon sample. This implies that GaN is transparent through long wave IR ($8\mu$ to $12\mu$).

EXAMPLE 3

Two samples of GaN were evaluated for IR transmission, and one of GaN on sapphire was evaluated for MMW transmission.

Sample Z202-2 was a polycrystalline/textured bulk GaN sample of semicircular shape of diameter 38 mm. The sample was double side polished with a 1-micron suspension solution and the thickness was 0.27 mm. It had a light brownish color.

Sample Z202-3 was a polycrystalline/textured bulk GaN sample of tetragonal shape of size 25×20 mm. The sample was double side polished with a 1 micron suspension solution and the thickness was 0.79 mm. It had a brownish color.

Sample AP-126-2 had a grown GaN Epi-layer of 11.5 microns thick on a 2" diameter and 330 microns (13 mils) thick double side polished Sapphire. The substrate orientation was on c-plane. The carrier concentration was about 1E16 $cm^{-3}$.

Figure 6A:
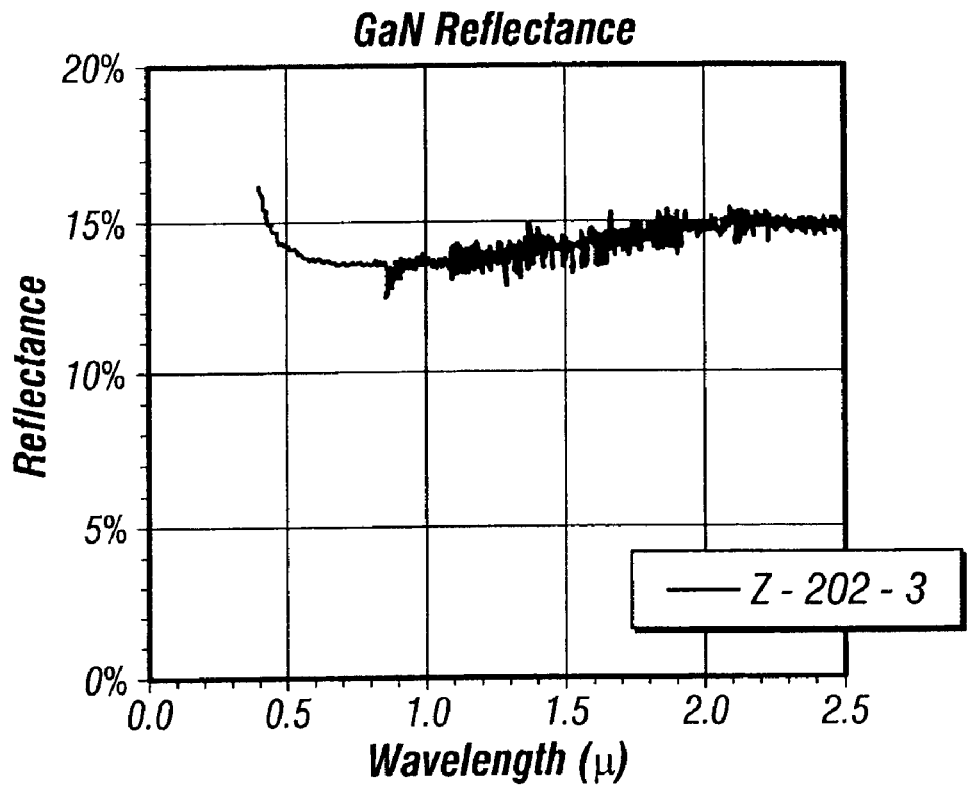
FIGS. 6(a) and (b) are graphs of bulk GaN reflectance in visible and IR ranges.
Figure 6B:
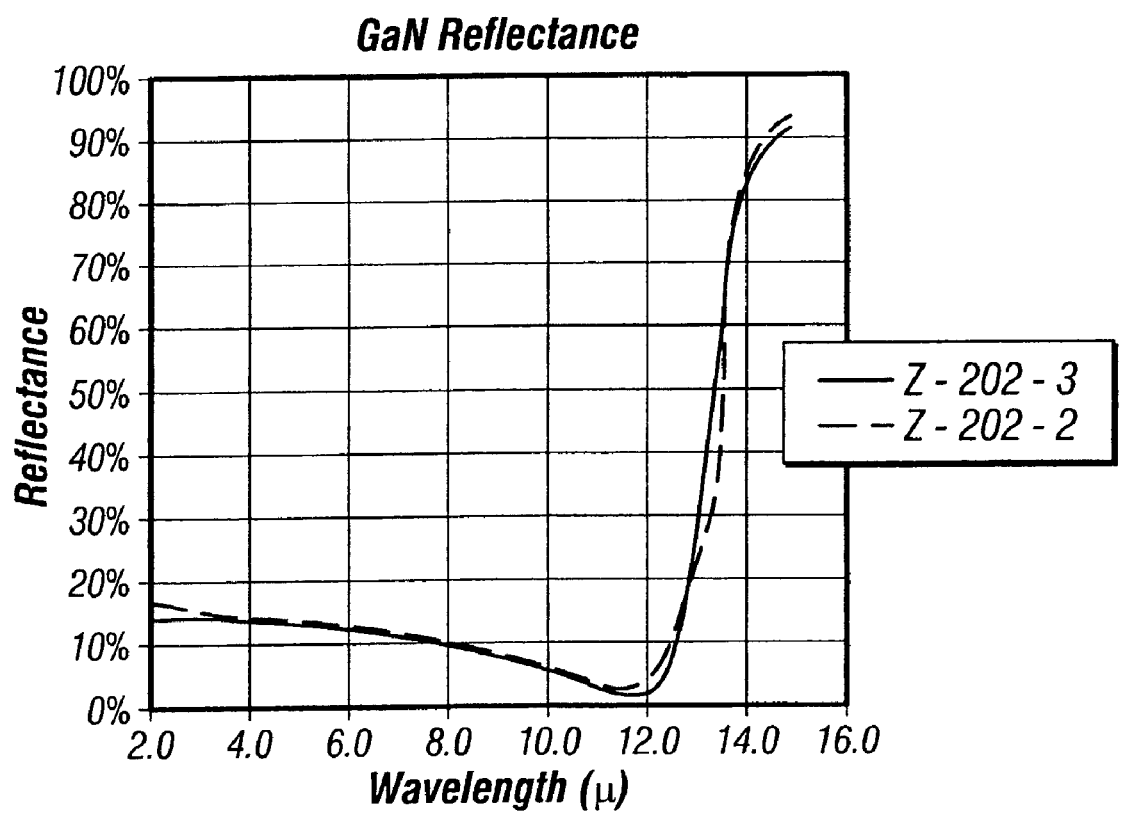
Figure 7A:
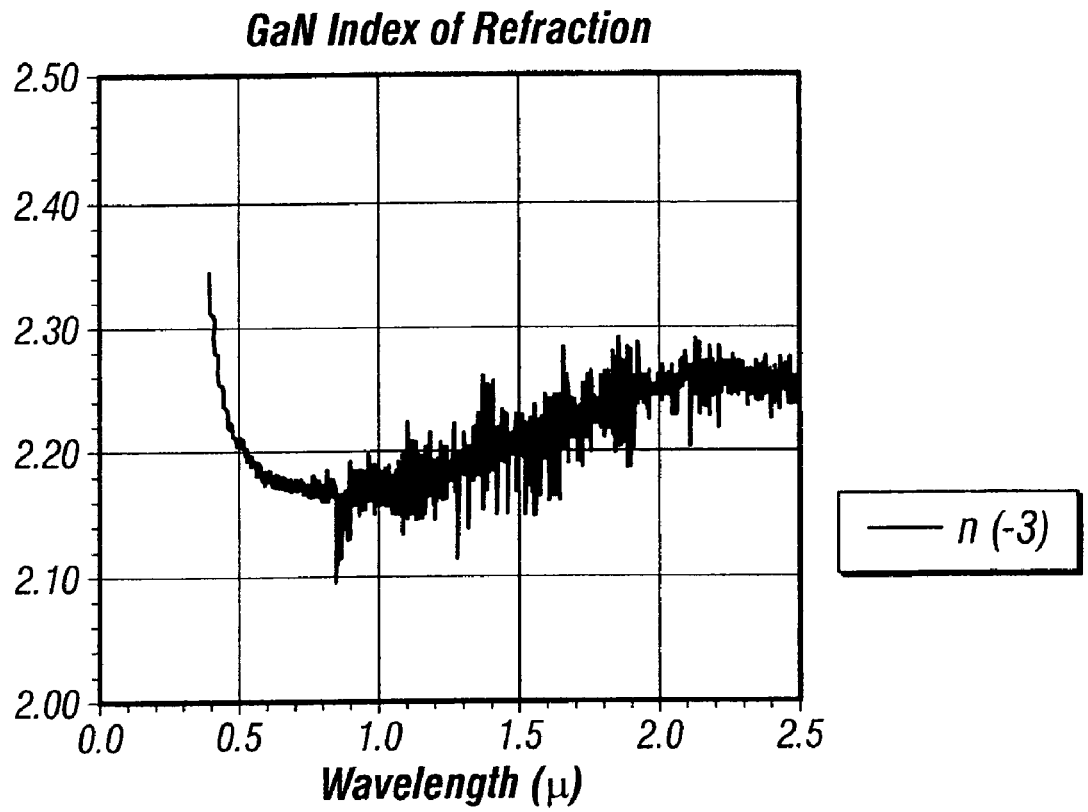
FIGS. 7(a) and (b) are graphs of bulk GaN index of refraction in visible and IR ranges.
Figure 7B:
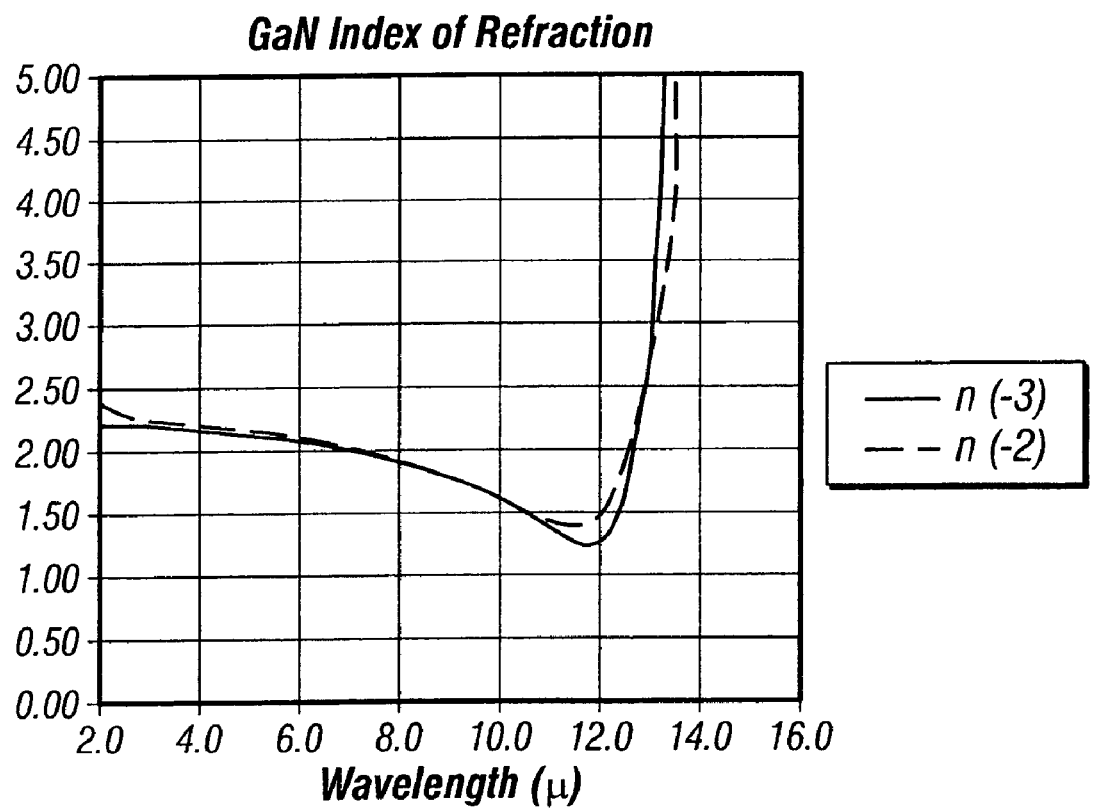
Figure 8A:
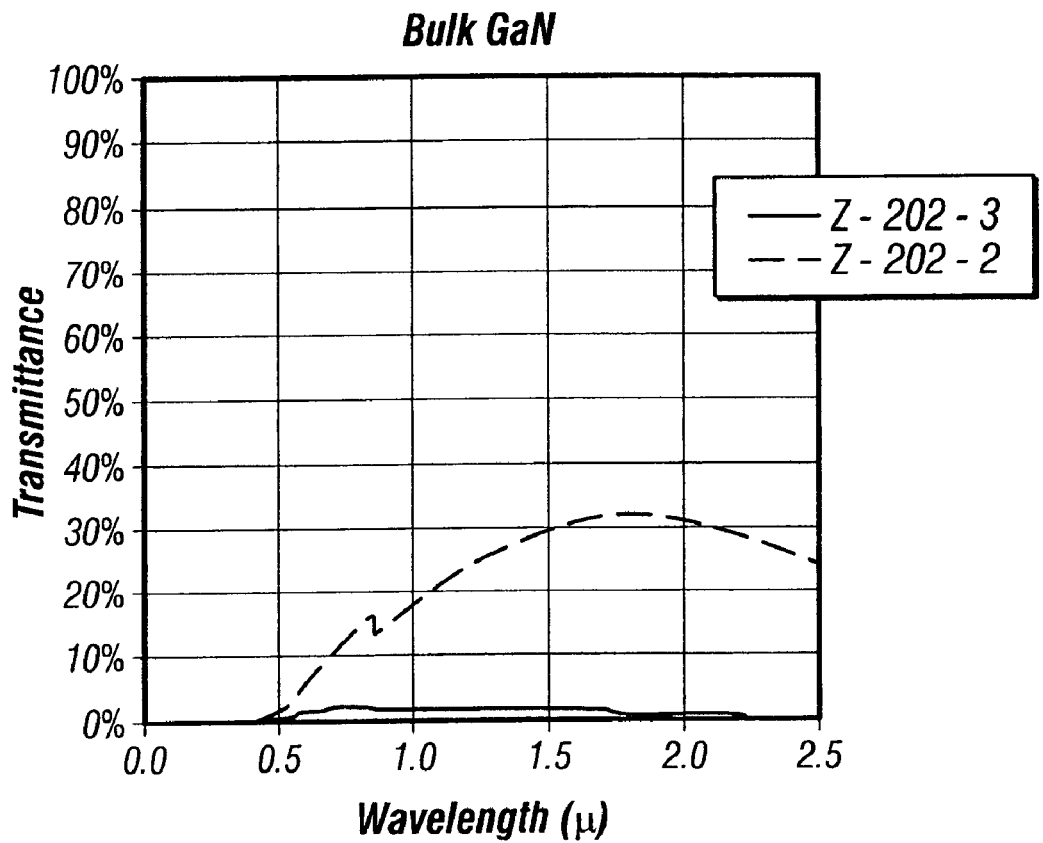
FIGS. 8(a) and (b) are graphs of bulk GaN transmission in visible and IR ranges.
Figure 8B:
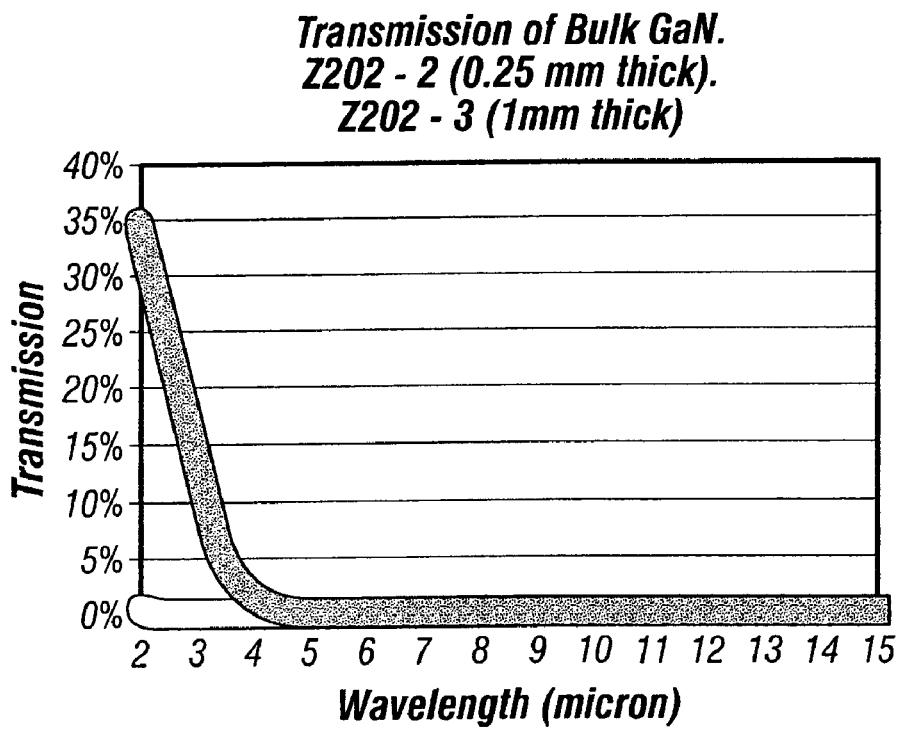

Sample transmission and reflection were measured under Perkin Elmer Lambda 9 for UV/Vis/NIR (170 nm-2500 nm) and Perkin Elmer Spectrum 2000 Optica for medium and far infrared (2-50 microns) (see FIGS. 6 and 8). The index of refraction of GaN can be deduced from the reflection measurement of the bulk GaN sample, especially from Z202-3, which shows very little transmission for all wavelengths. The equation is $R=\{(n-1)/(n+1)\}^2$. From the graph of FIG. 7, GaN has an index of refraction of 2.25+/−0.10 from 5000 A to 6 microns of wavelength.

The transmission of bulk GaN certainly depends on several absorption factors, such as thickness, imperfections and dopants. Both GaN bulk crystals were polycrystalline/textured samples and the grain boundary absorbs infrared light. Crystal Z202-3 (0.79 mm thick) shows less than 2% transmission from visible to 12 microns of wavelengths. Crystal Z202-2 (0.27 mm thick) shows a peak transmission of 34% at 1.8 microns of wavelength and decreased to less than 1% at 4 microns of wavelength.

Figure 9A:
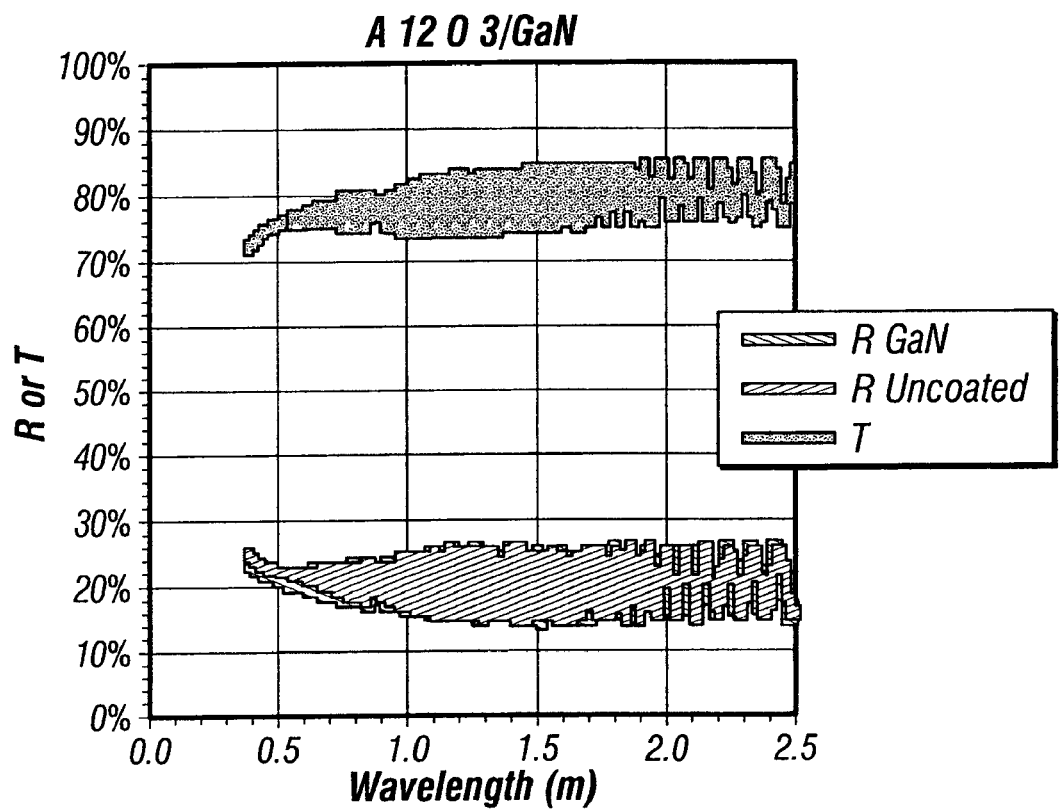
FIGS. 9(a) and (b) are graphs of GaN on sapphire transmission and reflection in visible and IR ranges.
Figure 9B:
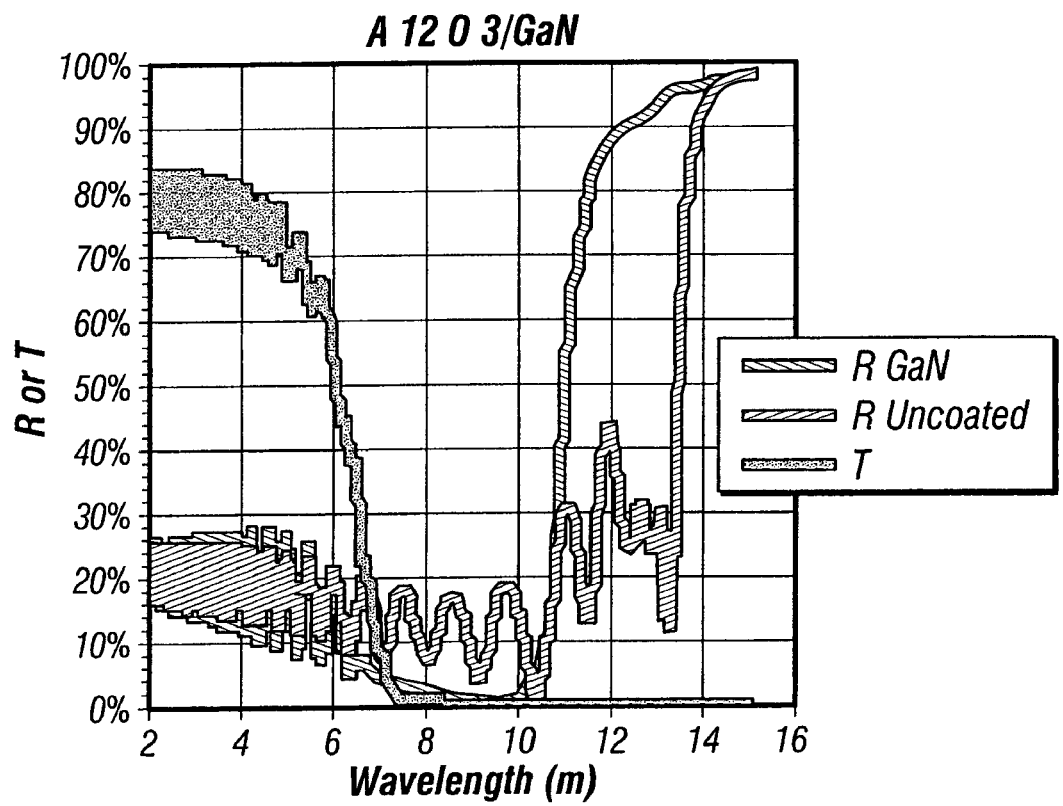

The standard transmission measurements on the GaN on sapphire sample (see FIG. 9) showed some oscillations, which resulted from the interference patterns of two parallel surfaces, i.e., epitaxial GaN and sapphire substrate. The periods of the oscillations correspond to the layer thickness. In addition, reflection measurements were made from both the sapphire side and GaN epitaxial layer side of the sample of GaN on sapphire. The difference in transmission near 10-12 microns of wavelength reflected the difference of absorption bands of GaN and sapphire.

The GaN epi-layer (11.5 microns thick and 1E16 $cm^{-3}$ carrier concentration) on sapphire is transparent from 4000 A to 6 microns, which is the cutoff wavelength of the sapphire substrate. The absorption of epi-layer GaN is at most 5%. All the samples were double side polished, which is good for transmission, but generates some interference patterns and some confusions in the reflection measurement. The index of refraction is about 2.25+/−0.05 from visible to 6 microns. The absorption characteristics cannot be accurately derived unless one can eliminate the specular reflection from the back side by roughening the surface of the bulk GaN sample.

The RF loss measurement on the GaN on sapphire sample was approximately 0.2 ohm-cm.

EXAMPLE 4

Based on the results from the first sample, several additional samples of GaN on sapphire were evaluated. These samples were designed to determine if there was a correlation between conductivity of the GaN and IR transmission. Further, the samples were designed to the same thickness so that the only variable in the testing was conductivity (see Table 1).

TABLE 1

GaN on Sapphire Sample Description

| | Sample Number | | | | |
|---|---|---|---|---|---|
| | AP219 | AP218 | AP217 | AP174 | AP126 |
| Donor Density/cm$^3$ | 3.00E+17 | 1.00E+18 | 8.00E+17 | 1.00E+16 | 1.00E+16 |
| Doping | Low | High | Mid | Undoped | Undoped |
| Thickness | 6μ | 5.6μ | 6.5μ | 6μ | 11.5μ |

Figure 10:
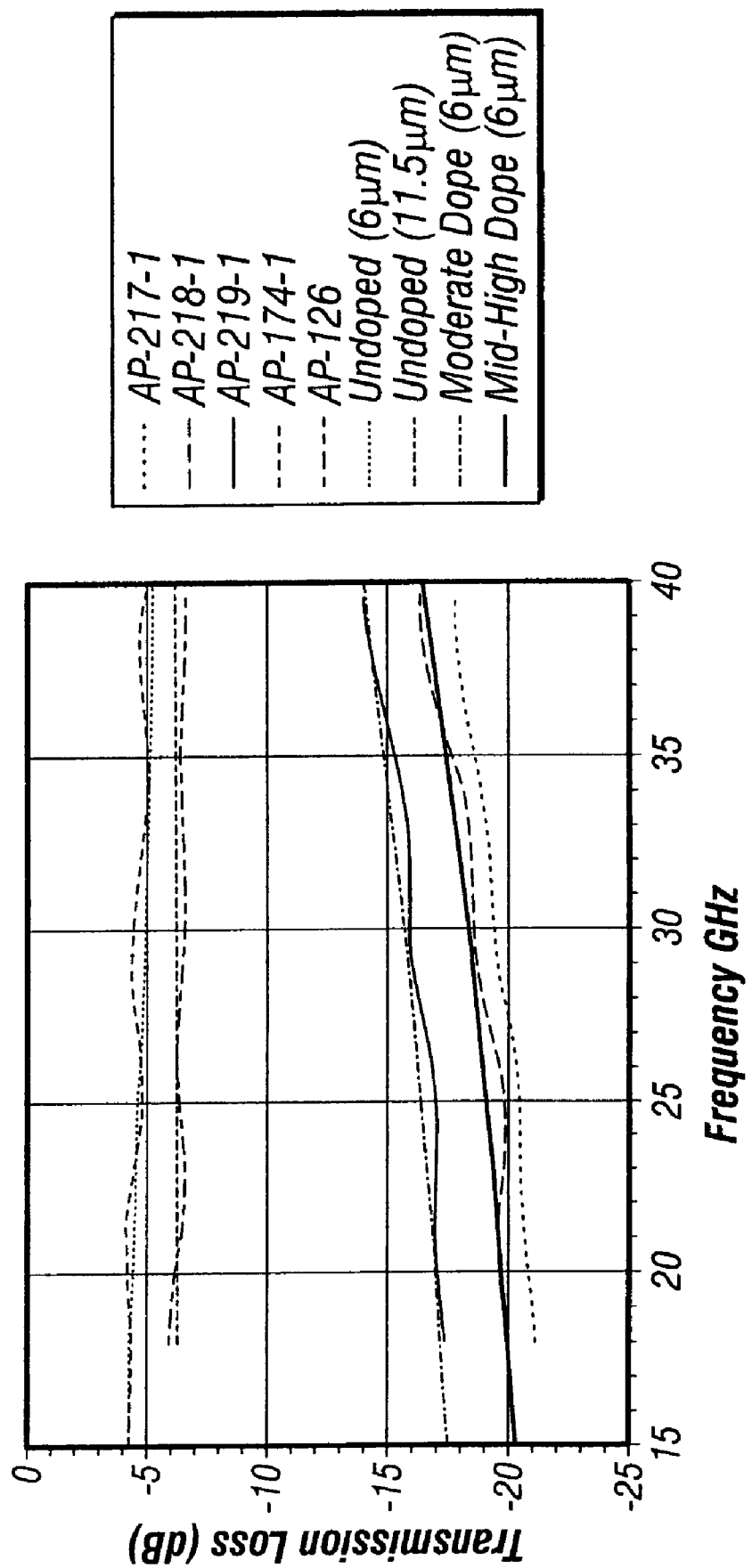
FIG. 10 is a graph of RF transmission loss of GaN on sapphire samples.
Figure 11:
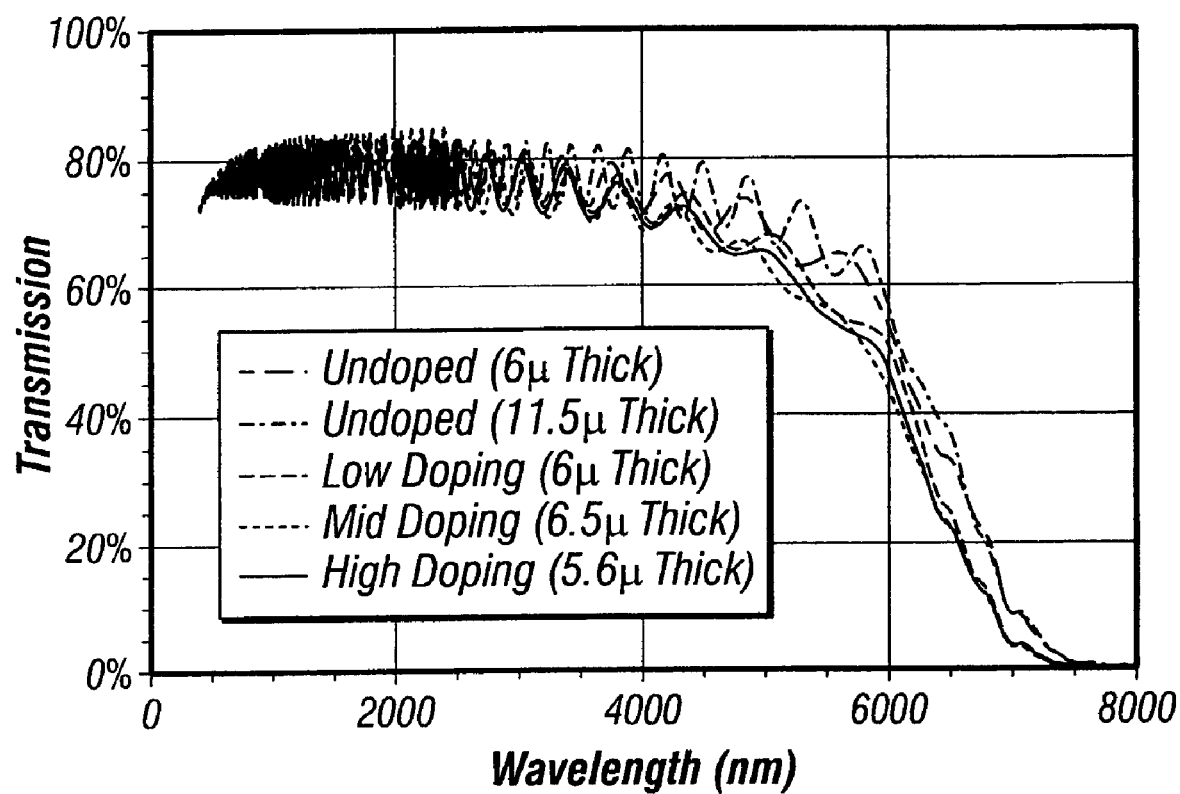
FIG. 11 is a graph of visible through mid-wave IR transmission of GaN on sapphire.

The additional GaN on Sapphire samples were evaluated for RF transmission from 18 GHz to 40 GHz. Note that the GaN was continuous, therefore, the transmission loss at 35 GHz is high (if a radome had a continuous film of copper, the transmission loss would also be high). The results from the testing are shown in FIG. 10. The undoped samples have less than 10 dB one-way transmission loss and that the loss is highly dependent on the thickness of the GaN (6μ vs. 11.5μ).

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of making a radome, the method comprising the steps of:
   providing an electro-optic transparent substrate selected from the group consisting of glass, silicon, MgF$_2$, ZnS, spinels, and combinations thereof;
   coating the substrate with a semiconductor, the coating providing substantial protection of a sensor from electromagnetic interference; and
   embedding a radio frequency selective surface in the coating.

2. The method of claim 1 wherein in the providing step the substrate comprises sapphire.

3. The method of claim 2 wherein in the coating step the semiconductor comprises GaN.

4. The method of claim 1 wherein in the coating step the semiconductor is selected from the group consisting of GaP, GaN, GaAs, SiC, Si, and combinations thereof.

5. The method of claim 1 wherein in the embedding step the surface is etched into the coating.

6. The method of claim 1 wherein in the embedding step the surface is ablated into the coating.

7. The method of claim 1 wherein the radome is usable with a common aperture electro-optic and radio frequency sensor.

8. A method of making a radome, the method comprising the steps of:
   providing an electro-optic transparent substrate, which is transparent to infrared wavelengths, selected from the group consisting of glass, silicon, MgF$_2$, ZnS, spinels, and combinations thereof;
   coating the substrate with an electro-optic transparent semiconductor; and
   embedding a radio frequency selective surface in the coating, wherein the resulting radome is electro-optic transparent to infrared wavelengths; and
   wherein the radome is usable with a common aperture electro-optic and radio frequency sensor.

9. The method of claim 8 wherein in the providing step the substrate comprises sapphire.

10. The method of claim 8 wherein in the coating step the semiconductor comprises GaN.

11. The method of claim 8 wherein in the coating step the semiconductor is selected from the group consisting of GaP, GaN, GaAs, SiC, Si, and combinations thereof.

12. The method of claim 8 wherein in the embedding step the surface is etched into the coating.

13. The method of claim 8 wherein in the embedding step the surface is ablated into the coating.

* * * * *